Patented May 15, 1934

1,959,324

UNITED STATES PATENT OFFICE 1,959,324

COMPOSITION AND METHOD FOR USE IN SECURING TOGETHER PIECES OF STOCK

Frederick S. Bacon, Newton, Mass., assignor to Boston Blacking & Chemical Co., Boston, Mass., a corporation of Massachusetts No Drawing. Application September 23, 1932, Serial No. 634,561

19 Claims. (Cl. 154—40)

This invention relates to improvements in the cementing together of pieces of stock by cellulose derivative cements, and is disclosed herein with reference to improved compositions for and methods of activating or softening hardened cement on the stock immediately prior to the placing of the pieces of stock in juxtaposition under pressure.

The invention finds particular application in the cement attaching of soles to shoe uppers and it is disclosed herein with reference thereto, though it should be understood that the invention in various of its phases is in no way limited to use in shoe manufacture.

In the manufacture of shoes wherein the soles are cement attached to the uppers it has been the practice to apply pyroxylin cement to the overlasted marginal portion of the shoe upper and to the marginal portion of the attaching surface of the sole and to permit the cement to dry. The cement on one or both of the shoe parts subsequently has been activated or cut with a softener and the shoe parts then assembled and placed under pressure which is maintained until the cement sets sufficiently to hold the shoe parts together without the aid of such pressure.

An object of this invention is to provide an advantageous composition for and method of softening or activating hardened cellulose derivative cements. A further object is to provide a cement softening composition for use in sole attaching which will permit ample time to assemble the shoe parts after activation of the cement, which will exert powerful and rapid softening action on the cement so that a strong union may be obtained over the cemented area, and which will permit the removal of pressure from the assembled shoe parts within a short time after the application of such pressure.

These and other objects are attained by compositions containing an alkylene oxide having from three to four carbon atoms, for example, alpha-propylene oxide, or isobutylene oxide (either with or without other pyroxylin solvents or diluents) together with pyroxylin or other cellulose derivative sufficient in amount to retard evaporation of the solvent portion of the composition to a substantial degree after the application thereof to the hardened cement on the parts to be joined and until pressure is applied to the assembled parts. The cellulose derivative is in most cases preferably of high viscosity such as of 100 seconds or higher.

The use of an alkylene oxide having from three to four carbon atoms, for example, a-propylene oxide,

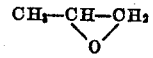

(boiling point 35-36° C.), or iso-butylene oxide,

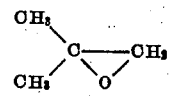

(boiling point 51-52° C.), in the solvent portion of the composition not only makes it possible to release the pressure within a very short time after the application thereof but by reason of their rapid and thorough cutting or softening action on the hardened cement makes more certain a sound and uniform bond over the entire area to be cemented and therefore provides a cemented joint of unusual effectiveness.

In one form of the invention the cellulose derivative is present in sufficient amount to impart to the composition a sufficiently viscous and/or plastic nature such that the composition may be applied to hardened cement in the form of a ribbon or layer which will remain in applied position without substantial lateral displacement but will flow under pressure applied thereto.

Two specific examples of compositions according to this form of the invention are as follows:

*Example 1*

|  | Grams |
|---|---|
| 1100-seconds viscosity pyroxylin | 248 |
| Denatured ethyl alcohol | 104 |
| Acetone (C. P.) | 1800 |
| A-propylene oxide | 900 |
| Total | 3052 |

*Example 2*

|  | Grams |
|---|---|
| 1100-seconds viscosity pyroxylin | 21 |
| Denatured ethyl alcohol | 9 |
| Iso-butylene oxide | 102 |
| C. P. acetone | 216 |
| Total | 348 |

The above compositions may be prepared by placing the ingredients in a suitable receptacle and rolling or otherwise agitating for a period of 2 to 6 hours.

The compositions described in the above examples have a low solid content. Thus the composition described in Example 1 contains about 8 per cent. pyroxylin and the composition given in Example 2 contains about 6 per cent. pyroxylin.

While the pyroxylin content may be varied it is preferably not increased beyond about 12 per cent. The solvent portion of the composition, which may include diluents, is ordinarily employed in proportions of 10 to 20 parts of solvent to one part of pyroxylin. It will be understood, however, that the softening compositions may be varied widely in the ingredients employed and in the proportions thereof while still coming within the scope of the invention.

The compositions cited in the above examples soften and cut rapidly the hardened cemented surfaces to which they are applied owing primarily to the high and rapid solvent action of a-pyropylene oxide and iso-butylene oxide, respectively, on pyroxylin, resulting in bonds of unusually high strength and efficacy. The aforementioned oxides have the characteristic, moreover, of dissipating rapidly from the cemented joint after the application of pressure, by evaporation or by penetration into the stock or otherwise, whereby the adhesive strength of the joint increases at a rapid rate. Consequently, by the use of these oxides in compositions of the type hereinabove outlined the pressure has been released after one or two minutes at which time the cement exhibited sufficient strength to hold the sole and shoe upper together without the aid of pressure.

Due to the relatively low boiling point of a-propylene oxide (35° C.) another solvent for pyroxylin of somewhat higher boiling point is preferably employed therewith, as indicated in Example 1 above, in which acetone (boiling point 56° C.) is employed with the a-propylene oxide in the proportion of about 2 to 1 parts by weight in order that the solvent may not tend to dissipate too rapidly during the assembly period while yet providing a short time dwell. Other solvents and diluents well known in this art may of course be employed with the a-propylene oxide in place of acetone or in conjunction therewith.

In view of the boiling point of iso-butylene oxide (52° C.) which is high enough to inhibit too rapid evaporation during the assembly of the shoe parts and yet low enough to provide a short time dwell, that is, a short time during which pressure is applied, the iso-butylene oxide may be employed as the sole constituent of the solvent portion of the composition, although other solvents and diluents of higher or lower boiling points may be employed therewith, as in Example 2, with advantageous results.

The cellulose derivative in the above examples serves to retard to a substantial degree the evaporation of the solvent portion of the composition after the softening composition has been applied to the hardened cement, and after such application of the softening composition permits 10 to 30 seconds or even longer to be taken to assemble the parts to be cemented and place them under pressure.

The viscosity characteristic of the pyroxylin (nitrocellulose) is referred to in terms of seconds in accordance with usual commercial practice, this viscosity being determined as described on pages 277–278 of a bulletin of the American Society for Testing Materials entitled "Tentative specifications and tests for soluble nitrocellulose" issued 1929, revised 1930. Further, the numerical value of the viscosity of the nitrocelluloses referred to herein, unless otherwise designated, relates to the present day commercial products, the actual viscosities of which vary within limits in the neighborhood of 10%.

The alcohol in the above compositions represents the wetting material ordinarily employed to render safe the handling of the nitrocellulose and may if conditions warrant be omitted.

While the above compositions may be applied to the surfaces of the hardened cement by brush or other suitable means known to those skilled in the art to which this invention appertains, they are preferably applied to predetermined areas of the cemented surface of an outsole or shoe upper in the form of a uniform layer or ribbon. Such ribbon may be applied to the cemented area of an outsole by a machine similar to that disclosed in United States Letters Patent No. 1,928,693, granted October 3, 1933, on an application of A. S. Johnson.

The application of pressure between the assembled shoe parts may be carried out, for example, in a sole press, such as disclosed in United States Letters Patent No. 1,897,105, granted February 14, 1933, on an application of Milton H. Ballard.

The a-propylene oxide and iso-butylene oxide may also be employed in a more fluid type of softener of somewhat watery nature (by which I mean that its viscosity is not more than a few times that of water) which may be applied to the hardened cement either by brushing the softening composition thereon or by dipping the cemented surface of the sole into the softening composition as, for example, by a softener applying mechanism disclosed in application Serial No. 396,554, filed October 1, 1929, in the name of C. E. Hood. Embodiments of this so-called watery type of softener embodying a-propylene oxide and iso-butylene oxide, respectively, are given in the following examples:

*Example 3*

|  | Grams |
|---|---|
| 330-second viscosity pyroxylin | 7 |
| Rezyl balsam | 12 |
| Gum camphor | 30 |
| Denatured ethyl alcohol | 3 |
| C. P. acetone | 500 |
| A-propylene oxide | 260 |
| Total | 812 |

*Example 4*

|  | Grams |
|---|---|
| 330-seconds viscosity pyroxylin | 7 |
| Rezyl balsam | 12 |
| Gum camphor | 30 |
| Denatured ethyl alcohol | 3 |
| Iso-butylene oxide | 200 |
| Ethyl ether | 300 |
| Acetone | 260 |
| Total | 812 |

The compositions given above in Examples 3 and 4 may be prepared by placing the ingredients in a suitable receptacle and rolling or otherwise agitating for a period of about 2 to 4 hours.

It will be noted that the compositions given in Examples 3 and 4 contain about one per cent. high viscosity pyroxylin together with additional solvent and solute material. The total solids content in the compositions of the above examples is about six per cent. In this form of the invention the total solids content incorporated in the fluid menstruum preferably do not constitute more than about 10 per cent. of the composition, although here again, as in the case of Examples 1 and 2, compositions according to this invention may be made embodying a large variety of ingredients in widely varying proportions.

The pyroxylin in the above compositions, Examples 3 and 4, slows down the evaporation of the solvent (including diluent) portion of the composition during the assembly of the shoe parts and the camphor and rezyl balsam add to the effectiveness of the nitrocellulose in this function, so that 25 or 30 seconds may be taken to apply the softener, assemble the parts, and put them under pressure. It will be noted that camphor is a solid solvent for nitrocellulose. However, pyroxylin alone may be employed for retarding the normal evaporation of the liquid portion of the composition until pressure has been applied to the parts to be joined.

Rezyl balsam is a well-known commercial synthetic resin and is a balsamic ester of phthalic anhydride and di-ethylene glycol and may be made by the methods described in Letters Patent of the United States, No. 1,690,515, Weber, by substituting di-ethylene glycol for the glycerol referred to in the patent.

It will be noted that other solvents and diluents may be employed with the a-propylene oxide and iso-butylene oxide, respectively, in order to impart desired properties to the composition. Thus acetone is associated with a-propylene oxide in Example 3, while acetone and ethyl ether are employed in conjunction with iso-butylene oxide in Example 4. By such combination of solvents the rate of dissipation of the softening composition after the application thereof to hardened cement, and other properties, may be controlled.

In the above compositions the desideratum under present manufacturing conditions is the employment of relatively high viscosity cellulose derivative with accompanying relatively low solid content. In some instances, however, it may be satisfactory to employ larger quantities of cellulose derivative of lower viscosity in order to obtain the desired retardation of the evaporation of the softening composition after the application thereof to the hardened cement.

While nitrocellulose has been cited as an example of a cellulose derivative, my invention may be carried out in connection with other cellulose derivatives. For example, when the cellulose derivative constituent of the cement is cellulose acetate, cellulose acetate is preferably employed in the softening composition. Likewise, the use of other cellulose esters and ethers is considered to be within the scope of my invention as herein disclosed and claimed.

Having described my invention, what I claim as new and desire to secure by Letters Patent of the United States is:

1. That improvement in methods of securing together pieces of stock which comprises applying pyroxylin cement to one or both of two pieces of stock which are to be secured together, permitting the cement to harden, and cutting the hardened cement on at least one of the pieces of stock with a solvent containing an alkylene oxide of the group comprising a-propylene oxide and iso-butylene oxide and in which is dissolved sufficient pyroxylin substantially to retard the evaporation of said solvent, assembling the pieces of stock in desired relation, and applying pressure thereto.

2. A composition for use in cutting nitrocellulose cement which has been applied to a shoe part and dried comprising a solvent containing a substantial amount of an alkylene oxide of the class consisting of a-propylene oxide and iso-butylene oxide and having dissolved therein nitrocellulose of at least several hundred seconds viscosity.

3. A composition for use in softening hardened pyroxylin cement on a shoe sole and upper immediately prior to the assembly of the shoe parts under pressure comprising a solvent containing a substantial amount of an alkylene oxide of the class consisting of a-propylene oxide and iso-butylene oxide and having sufficient pyroxylin dissolved therein to permit an assembly time of about 10 to 30 seconds while yet permitting the removal of the pressure within a few minutes after the same is applied.

4. A softener for activating dried cellulose derivative cement comprising a solvent containing a substantial amount of an alkylene oxide having from three to four carbon atoms and in which is dissolved sufficient high viscosity cellulose derivative to impart to the softener a viscosity or plasticity such that it will stay where it is placed on the dried cement without substantial flowage but will flow under pressure applied thereto.

5. A composition for use in cutting dried pyroxylin cement comprising not over about 12% nitrocellulose having a viscosity characteristic of not less than several hundred seconds dissolved in a solvent containing a substantial proportion of an alkylene oxide of a class consisting of a-propylene oxide and iso-butylene oxide.

6. A composition for use in cutting pyroxylin cement which has been applied to a shoe part and dried comprising one part by weight of nitrocellulose of about 1100 seconds viscosity dissolved in about 10 to 20 parts of a solvent containing a substantial proportion of a-propylene oxide or iso-butylene oxide.

7. A composition for use in cutting dried nitrocellulose cement comprising one part by weight of pyroxylin of at least several hundred seconds viscosity dissolved in from 10 to 20 parts of a solvent comprising acetone and a-propylene oxide.

8. A composition for use in cutting dried pyroxylin cement comprising the following ingredients in about the following proportions:

| | Grams |
|---|---|
| (Dry basis) pyroxylin of approximately 1100 seconds viscosity | 248 |
| Alcohol | 104 |
| Acetone | 1800 |
| A-propylene oxide | 900 |

9. A composition for softening hardened cellulose derivative cement comprising cellulose derivative dissolved in sufficient solvent containing an alkylene oxide having from three to four carbon atoms to form a composition of a freely fluent somewhat watery nature.

10. A composition for use in cutting dried nitrocellulose cement comprising solvent material of a class consisting of an alkylene oxide having from three to four carbon atoms together with a solid solvent for nitrocellulose and also nitrocellulose having at least several hundred seconds viscosity.

11. A composition for use in cutting nitrocellulose cement which has been applied to stock and dried comprising solvent material for nitrocellulose including an alkylene oxide of the group comprising a-propylene oxide and iso-butylene oxide and containing nitrocellulose having a viscosity of at least about several hundred seconds and camphor.

12. A composition for use in cutting pyroxylin cement which has been applied to a shoe part and dried comprising not over about 10% solids including high viscosity pyroxylin in a fluid menstruum containing one or more alkylene oxides of the group consisting of a-propylene oxide and iso-butylene oxide.

13. A composition for use in cutting pyroxylin cement which has been applied to a shoe part and dried comprising about 1% pyroxylin of at least several hundred seconds viscosity dissolved in a solvent containing a-propylene oxide.

14. A composition for use in cutting nitrocellulose cement which has been applied to a shoe part and dried comprising acetone, propylene oxide, camphor, rezyl balsam, and a small amount of nitrocellulose of at least several hundred seconds viscosity.

15. A composition for use in cutting pyroxylin cement which has been applied to a shoe part and dried comprising solvent material including a-propylene oxide, together with camphor, rezyl balsam, and a small amount of nitrocellulose.

16. A composition for use in cutting nitrocellulose cement comprising about 94% of a low boiling solvent for pyroxylin including a-propylene oxide and a total of about 6% of camphor, rezyl balsam and high viscosity nitrocellulose.

17. A composition for use in cutting pyroxylin cement which has been applied to a shoe part and dried comprising in the neighborhood of 25% of iso-butylene oxide, about 1% of high viscosity pyroxylin together with additional solvent and solute material.

18. That improvement in methods of securing together pieces of stock at least one of which is coated with hardened cellulose derivative cement which comprises applying to the surface of the hardened cement on at least one of said pieces of stock a solution of a high viscosity cellulose derivative in a solvent containing an alkylene oxide having from three to four carbon atoms, and bringing the pieces of stock together under pressure.

19. That improvement in methods of securing together pieces of stock each of which is coated with hardened pyroxylin cement which comprises applying to the surface of the hardened cement on one of said pieces of stock a solution of high viscosity pyroxylin in a solvent containing propylene oxide, and bringing the pieces of stock together under pressure.

FREDERICK S. BACON.